(12) United States Patent
Sahu et al.

(10) Patent No.: US 9,172,260 B2
(45) Date of Patent: Oct. 27, 2015

(54) EFFICIENT BATTERY MANAGEMENT SYSTEM

(71) Applicants: Saroj Kumar Sahu, Fremont, CA (US); Madhushree Patnaik, Fremont, CA (US)

(72) Inventors: Saroj Kumar Sahu, Fremont, CA (US); Madhushree Patnaik, Fremont, CA (US)

( * ) Notice: Subject to any disclaimer, the term of this patent is extended or adjusted under 35 U.S.C. 154(b) by 198 days.

(21) Appl. No.: 13/873,878

(22) Filed: Apr. 30, 2013

(65) Prior Publication Data

US 2014/0320065 A1    Oct. 30, 2014

Related U.S. Application Data

(60) Provisional application No. 61/641,282, filed on May 1, 2012.

(51) Int. Cl.
*H02J 7/00*    (2006.01)

(52) U.S. Cl.
CPC .................... *H02J 7/0019* (2013.01)

(58) Field of Classification Search
None
See application file for complete search history.

(56) References Cited

U.S. PATENT DOCUMENTS

| | | | | |
|---|---|---|---|---|
| 3,997,830 A | * | 12/1976 | Newell et al. | 320/102 |
| 5,410,239 A | * | 4/1995 | Yang | 320/134 |
| 2002/0047685 A1 | * | 4/2002 | Perelle | 320/119 |
| 2014/0285936 A1 | * | 9/2014 | Garbacik et al. | 361/88 |

* cited by examiner

*Primary Examiner* — Charlie Y Peng
(74) *Attorney, Agent, or Firm* — Chen-Chi Lin

(57) ABSTRACT

A battery management system that monitors and controls the charging and discharging of a battery pack in the most versatile way at the block level with little dissipative loss but fast balancing is disclosed. The system has capability of using blocks of cells using different chemistry in the same battery pack. Such versatility makes it very useful for usage with erratic grid conditions, solar, wind and other natural energy sources for charging the battery.

10 Claims, 12 Drawing Sheets

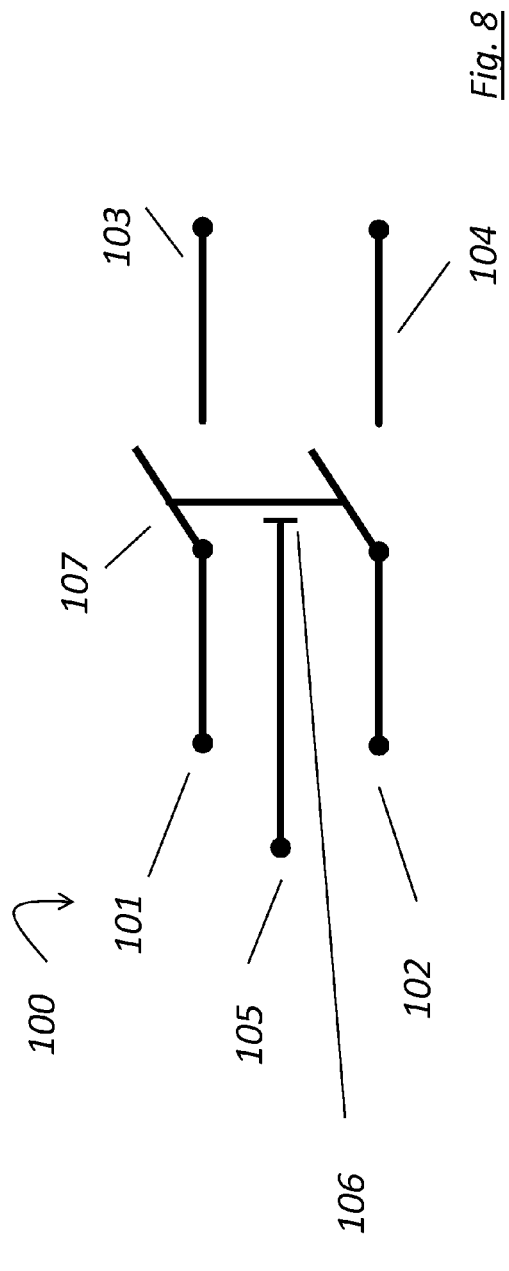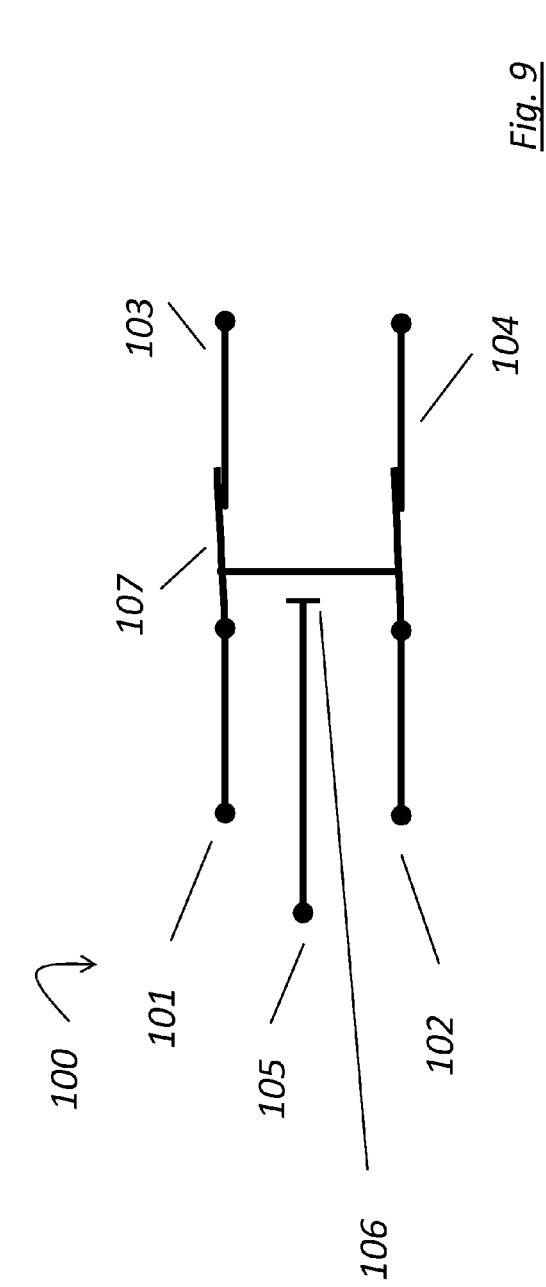

EFFICIENT BATTERY MANAGEMENT SYSTEM

TECHNICAL FIELD

The present invention relates generally to the field of battery systems, and more particularly to a method and system for charge equalization in a flexible chemistry and flexible capacity battery system.

BACKGROUND ART

The following terminology is adopted in this disclosure.

Cell: The Cell 10 as described in FIG. 1 is the most basic element of a battery system, with positive and negative terminals, storing and dispensing electrical energy through an electrochemical process. For example, it could be a nominal 3.7 V Lithium ion cylindrical cell or a nominal 2.1V Lead-Acid prismatic cell. A Cell is usually characterized by its AC Impedance (ACI), Equivalent Series Resistance (ESR), Capacity (in Amp.Hour, or in short, Ah), and Nominal Cell Voltage. The manufacturer typically provides many other parameters, such as cycle life, optimal temperature, maximum charge and discharge rate.

Block: The Block 20, as described in FIG. 2, is a collection of Cells 10 wired directly in parallel, providing the same voltage as individual Cells. All the Cells in a block must belong to the same chemistry. For instance, all Lithium Carbonate (LCO) cells, or all Lead-Acid cells. A typical Block may have as few as 1 Cell and some times as many as 1000 Cells or more. The current collector 21 is a conductive path, typically a metallic plate that is connected to all the positive terminals of the Cells in the Block. There are many methods of connection including soldering, welding, and spring contact. The current collector 22 is a conductive path, typically a metallic plate that is connected to all the negative terminals of the Cells in the Block. Methods of connection are similar to that of the positive side.

Although a stacked approach is shown in FIG. 2 for building a Block out of Cells, there are many other ways of making a Block as known to an expert in the field of battery manufacturing. For instance, many cells may be inserted into a set of spring-contact connectors, and the respective conductive contacts may then be electrically joined together to make a Block.

While these examples are cited for the reason of comprehension, it is to be understood that a Block is essentially a collection of Cells connected electrically in parallel.

Battery: A collection of Blocks wired in series. For instance, a 3S4P Lead-Acid battery consists of 3 Blocks wired in Series, with each Block containing 4 Cells in parallel. Such a battery would have a nominal voltage of 6.3V (Three in series multiplied by 2.1V of nominal Cell voltage). In FIG. 3 an example of a 3S4P Battery is shown. The battery 30 consists of three Blocks—35, 36 and 37. The positive terminal of the first battery 35 is typically connected to a current carrying wire 31, and is available to external devices as the positive terminal for the entire battery. The negative terminal of the last battery 37 is typically connected to a current carrying conductor 32, and is available to external devices as the negative terminal for the entire battery.

The Series connection is realized by connecting opposite parity terminals of consecutive blocks. For instance, in FIG. 3, the negative plate 22 of the top block 35 is connected electrically to the positive terminal 21 of the middle block 36.

The Blocks connected such may be enclosed in a mechanical cover 33 for safety or mechanical convenience.

In certain instances a Battery may be packaged in such a way that Cells of the same Block may be placed at different mechanical locations, but electrically they would be considered to belong to the same Block. In FIG. 4 we show an example of this, wherein the Battery 40 consists of two mechanical assemblies 44 and 45. It is to be noted that the two assemblies are indeed connected in parallel at the Block level. For example, the group of Cells 46 are electrically connected in parallel with the group of Cells 47. The same applies to other groups of Cells. In this case, the groups of Cells 46 and 47 belong to a single Block. For the purposes of this disclosure, this Battery would be considered as 3S8P, consisting of 3 Blocks, with each Block containing 8 Cells. The groups 46 and 47 for instance, form one Block of 8 Cells.

Battery Management System (BMS): An electronic system that has components addressing, monitoring and communicating between Blocks to control the electron flow to create a balance between all the Blocks according to a pre-determined logic. The BMS also makes decisions, such as disengaging the Battery from the outside electricals in the event of high voltage, high charge or discharge current, high internal or external temperatures, Cell failures, and re-engaging when such conditions are rectified.

Pack: A Battery mechanically and electrically packed with a Battery Management System (BMS) voltage, current, and thermal sensors, and optionally active or passive thermal control devices to keep the battery at a desired temperature range.

FIG. 5 shows a Battery with 3 Blocks in series. The Battery may have been charged and discharged through any number of cycles. If voltages of all the Blocks are identical or nearly identical (typically within +/−3%), then the Battery is considered to be balanced. In the case of FIG. 5, all the three Blocks have 4.2V across them—hence the Battery is balanced. In FIG. 6, the Battery has 3 Blocks, but at a given instant of time, the voltages across the Blocks are 4.4V, 4.0V and 4.2V—all different significantly from one another. (at least one Block >3% off from at least one other Block). Such a Battery is called unbalanced.

In FIG. 7 we show a BMS that exists in the prior art and is commercially available. The Battery 30 is connected to a charger 51 and a load 52 at its positive terminal. A BMS 55 is connected to the Battery in a way that it has electrical access to every terminal of every Block. For instance, the electrical line 56 is connected to the connection wire 34 between the top and the middle Block.

The electrical circuit from the charger or the load goes through the Battery positive and negative terminals, and is terminated back through the BMS. The negative terminal connections are not shown to maintain the clarity of the figure. A practicing engineer in the field will know that the negative terminals of the Battery, the Charger, the Load and the BMS would be tied together. The BMS therefore has the capability to close or open the electrical circuits for charging or discharging (through the load) upon certain conditions. In FIG. 7, the electrical lines 53 and 54 from the BMS control the circuit closure of the charger and the load, respectively. A temperature sensor 57 such as thermistor is also placed into the Battery 30 and is wired to the BMS 55 with an electrical connection 58.

Such a BMS has the following major intentions—
To monitor the Blocks in the Battery
To protect the battery
To estimate the battery's state of charge or instantaneous capacity
To maximize the Battery's performance by balancing the Blocks.

To communicate any important parameters of the battery to an external device or a user.

The general management functions of such a BMS are—
1. Protection: Not allowing the battery, any block or any cell to operate outside of recommended operating parameters. Such function can be further subdivided as—
   (a) Prevent the voltage of a Block from exceeding a limit, by stopping the charging current. In Lead-Acid batteries an excess voltage would cause excess generation or hydrogen and oxygen, while in a Lithium Ion battery it can cause the cell to fail and explode, thus compromising safety.
   (b) Prevent the temperature of any Cell or any Block from exceeding a limit by stopping the battery current, or requesting that it be cooled. Most Lithium Ion cells are prone to a thermal run-away if such safety mechanism is not incorporated by a BMS.
   (c) Prevent the voltage of any Cell or Block from dropping below a limit by stopping the discharging current. For instance, in Lithium Ion batteries, an electrode may dissolve in the electrolyte if the Cell is allowed to discharge below a certain low voltage—around 2.3V. In case of Lead-Acid Cells, sulfation of electrodes may occur at very low battery voltages. In many cases such effects cause irreversible damage to the Cell.
   (d) Prevent charging current from exceeding a limit by reducing or stopping the current. For instance, in Lead acid and Lithium Ion Cells, a higher charging current than recommended causes permanent damage to electrodes, and may result in unsafe conditions. Typically, the charge current limit is a function of Block voltage, temperature, state of charge and the previous level of current.
   (e) Prevent discharging current from exceeding a certain limit by reducing or stopping the current. For instance, in Lead acid and Lithium Ion Cells, a higher discharging current than recommended causes permanent damage to electrodes, and may result in unsafe conditions. Typically, the charge current limit is a function of Block voltage, temperature, state of charge and the previous level of current.
2. Thermal Management: Controlling the thermal actuators and devices for the Pack to maintain the temperature of the Battery, its Cells and its Blocks within a recommended range. For instance, the Pack may contain thermoelectric devices (TEC) that can add to or subtract heat from the Pack with the application of a controlled current. The Cell manufacturer's recommendation may be to run the Battery then between 15 deg C. and 35 deg C. During the operation of the battery, if the temperature falls below 15 deg C. for any block, then the TEC could be instructed to heat the pack, whereas if the temperature goes above 35 deg C., the TEC could be instructed to cool the pack. Such decisions would be taken by the BMS.
3. Balancing: Maximizing the battery's capacity by distributing or redistributing the charge among the Blocks as the battery undergoes charging and discharging.

This invention pertains to the balancing action of the BMS. During charge and discharge of the Battery, one pushes a certain amount of charge into each Cell. If each Cell were identical in all respect, then the Battery would stay balanced at all times, but two Cells are never the same. Due to manufacturing variations, and post-manufacturing treatments, the Cells develop different characteristics, as follows, which result in their different capacity behavior.
   1. Cell resistance or Equivalent Series Resistance (ESR). If the ESR of a Cell is higher compared to other Cells, it will respond with a larger polarization voltage than others in series to the response of the same charging current.
   2. Capacity. Two different Blocks may not have the same electrochemical capacity, in which case, in response to the same charging current, the voltages will be different.
   3. Leakage. Depending on the age of the Blocks, two different Cells in two different Blocks may have different internal leakage currents. Leakage current is responsible for self-discharge of a Cell, and therefore affecting the capacity of the Cell and in turn, of the Block. As a result, the effective charge and discharge capacities will be different, and will have different voltages in response to same charging current.
   4. SOC. If the blocks started operating with different SOCs to start with, or if parasitic loads are taken off from intermediate blocks in a battery, the battery as a whole will stay unbalanced.

Different BMS devices do the balancing in different ways. The schemes known so far include the following—
   (a) Shunt Regulator Bypass: In this case a shunt power regulator is placed across each block in the BMS. During charging, when a block reaches the maximum recommended voltage, the shunt bypasses the block. Although this seems simple, the shunt regulator has to be able to carry the entire charging current in the bypass mode, which results in expensive electronics. Besides, when this happens with one or more cells, the battery charging voltage must drop keeping the current the same, thus charging the rest of the blocks. The charger needs to be able to accommodate such a voltage swing, which is not easy. Besides, if the charger is connected to a load, the load specifications may not allow this voltage swing to happen. Consequently, such a scheme is not very popular and is used only where the charging current is low (<1 A or so)
   (b) Dissipation: In this case, at a pre-determined range of voltage or SOC, all the blocks that have higher voltage or SOC burn some power by trickling some current to the ground or another cell. While this remains as a popular method, it is wasteful in terms of energy. This method also creates a lot of heat in the Pack, due to which thermal management becomes difficult.
   (c) Distribution: In this case, during the charging of the battery, the Blocks that have higher voltage or SOC transfer some of their capacity to the entire Battery chain or a section of it by switching regulators. While this is less wasteful than dissipative methods, it requires high current switching passives (such as inductors and capacitors), need a lot of discrete components, and reliability and cost concerns are high.

While all the above methods are in use today, they still cannot satisfy some fundamental needs of the industry.
   1. All of them still have some dissipation, and as the Cells grow older, the dissipation becomes a significant portion of the total energy transacted during charging and discharging. Besides reducing the efficiency of the product, it creates heating problems in enclosed Packs.
   2. If different Blocks in a battery have Cells of different chemistries, the blocks would then have different charge and discharge termination voltages and therefore none of the schemes above would work.

3. If some Blocks have significantly higher leakage, then balancing becomes even more wasteful and may never eventually bring the Cells to an effective balance.
4. If the Blocks have different number of Cells, or have different operational history, then their effective capacities may be different, and therefore the schemes would be highly dissipative or be generally ineffective.
5. These schemes generally do not offer a good way to keep the Blocks balanced during discharging.

SUMMARY OF INVENTION

It is an object of this invention to provide a method of balancing a Battery with minimal dissipation.

It is also an object of this invention to provide a method of balancing a Battery very fast when Cells or Blocks of very different initial states of charge are introduced at the beginning.

It is also an object of this invention to provide a method of balancing a Battery when the effective capacities of the individual Blocks in series have become different as a result of usage history.

It is also an object of this invention to provide a method of balancing a Battery that may have Blocks of different chemistries, different SOCs, different capacities and different operational history.

It is also an object of this invention to provide a method of balancing a Battery with that keeps balancing the Blocks during both, charging and discharging of the Battery.

BRIEF DESCRIPTION OF THE DRAWINGS

FIG. 8: A DPST (Dual Pole Single Throw) switch in its default NO (Normally Open) state.
FIG. 9: A DPST switch in its activated CLOSED state.

DETAILED DESCRIPTION OF INVENTION

DPST Switch

Figure 1:
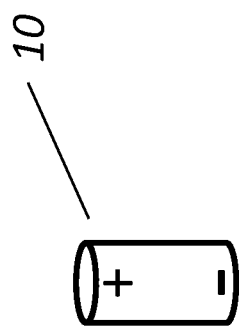
FIG. 1: Representation of a basic electrochemical cell.
Figure 2:
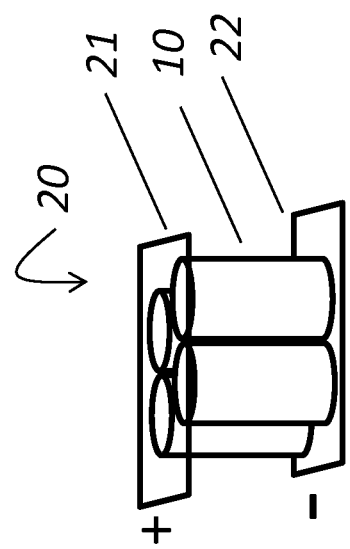
FIG. 2: Representation of a Block of electrochemical cells.
Figure 3:
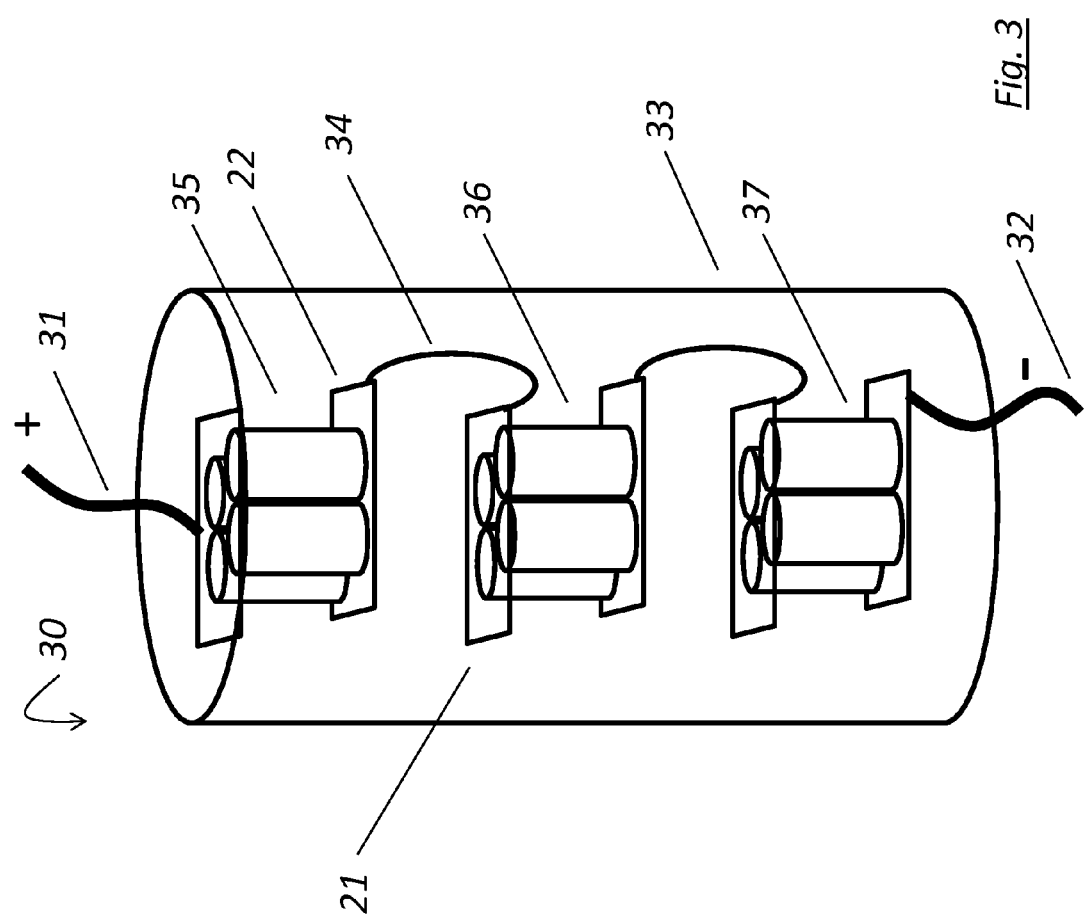
FIG. 3: Representation of a Battery built out of Blocks.
Figure 4:
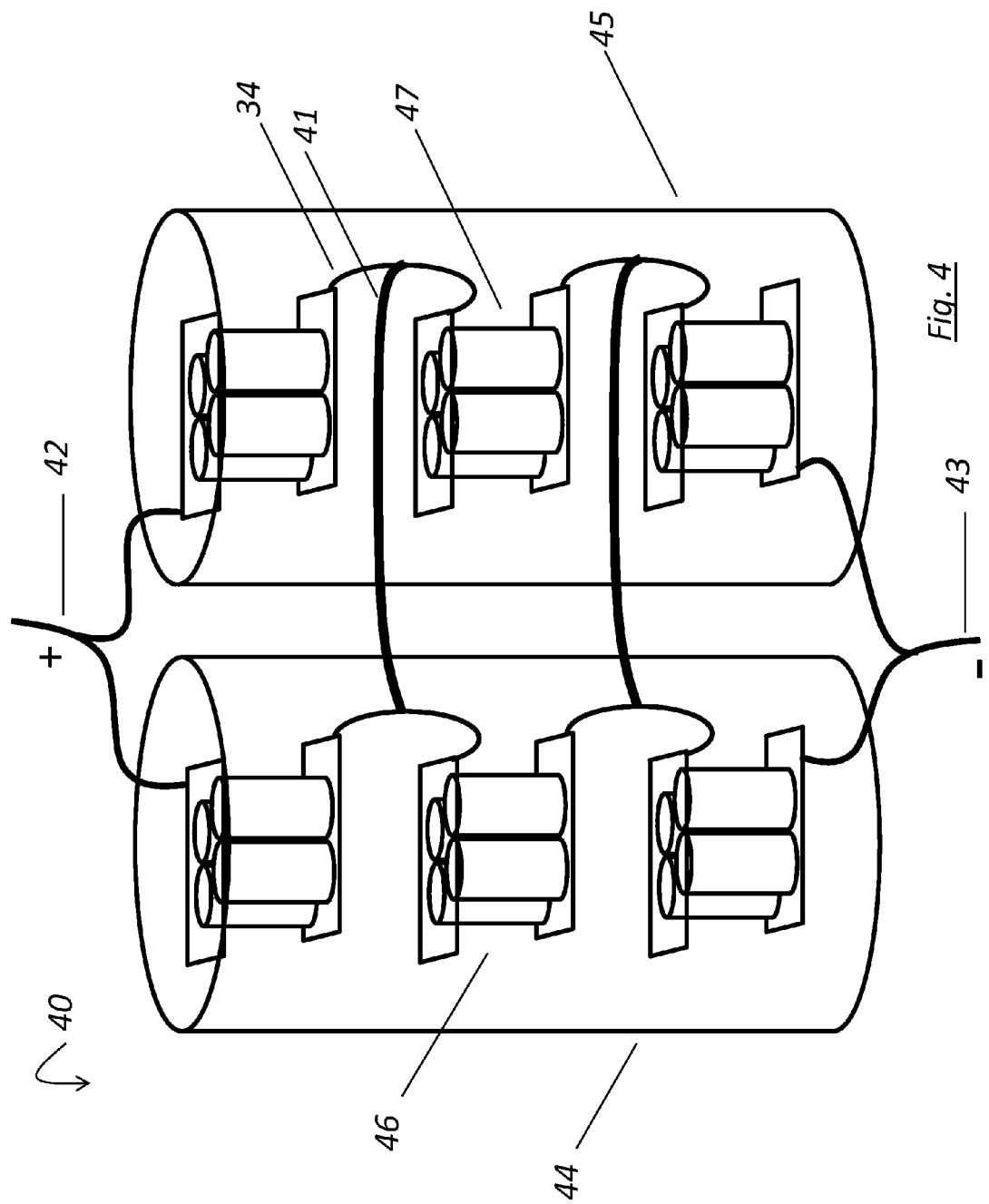
FIG. 4: A Battery with segregated packs.
Figure 6:
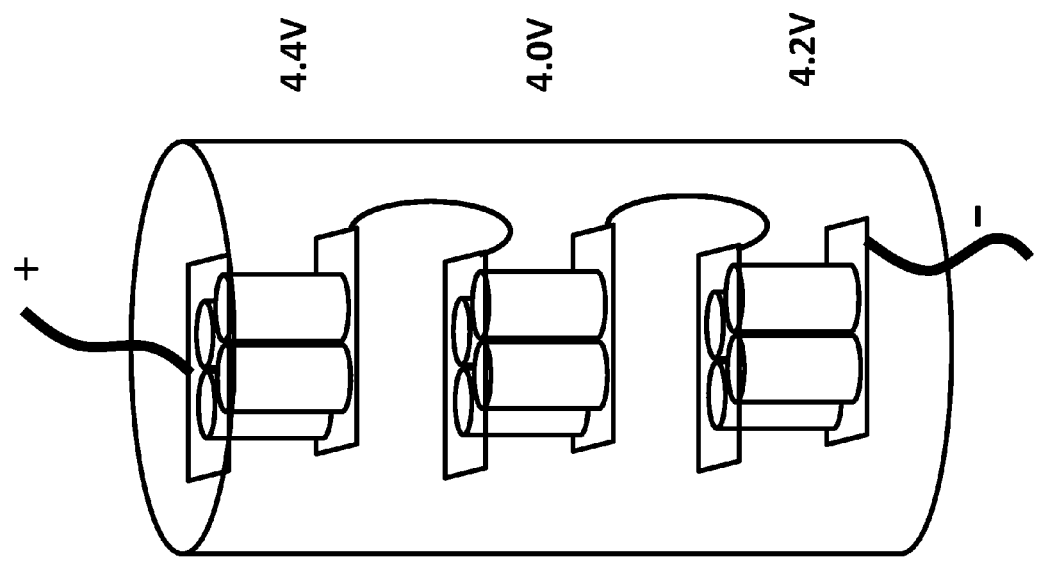
FIG. 6: A Battery with unbalanced Blocks.
Figure 5:
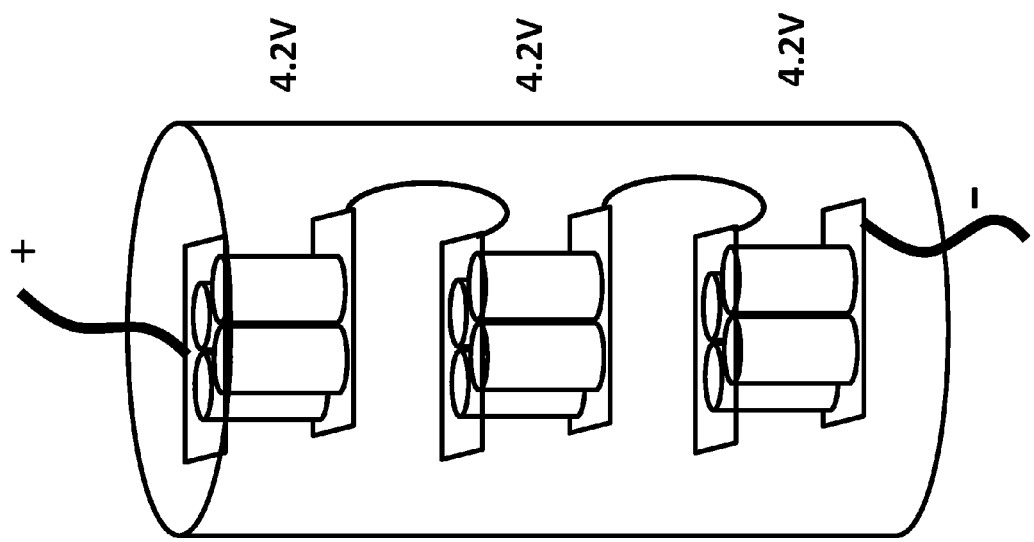
FIG. 5: A Battery with balanced Blocks.
Figure 7:
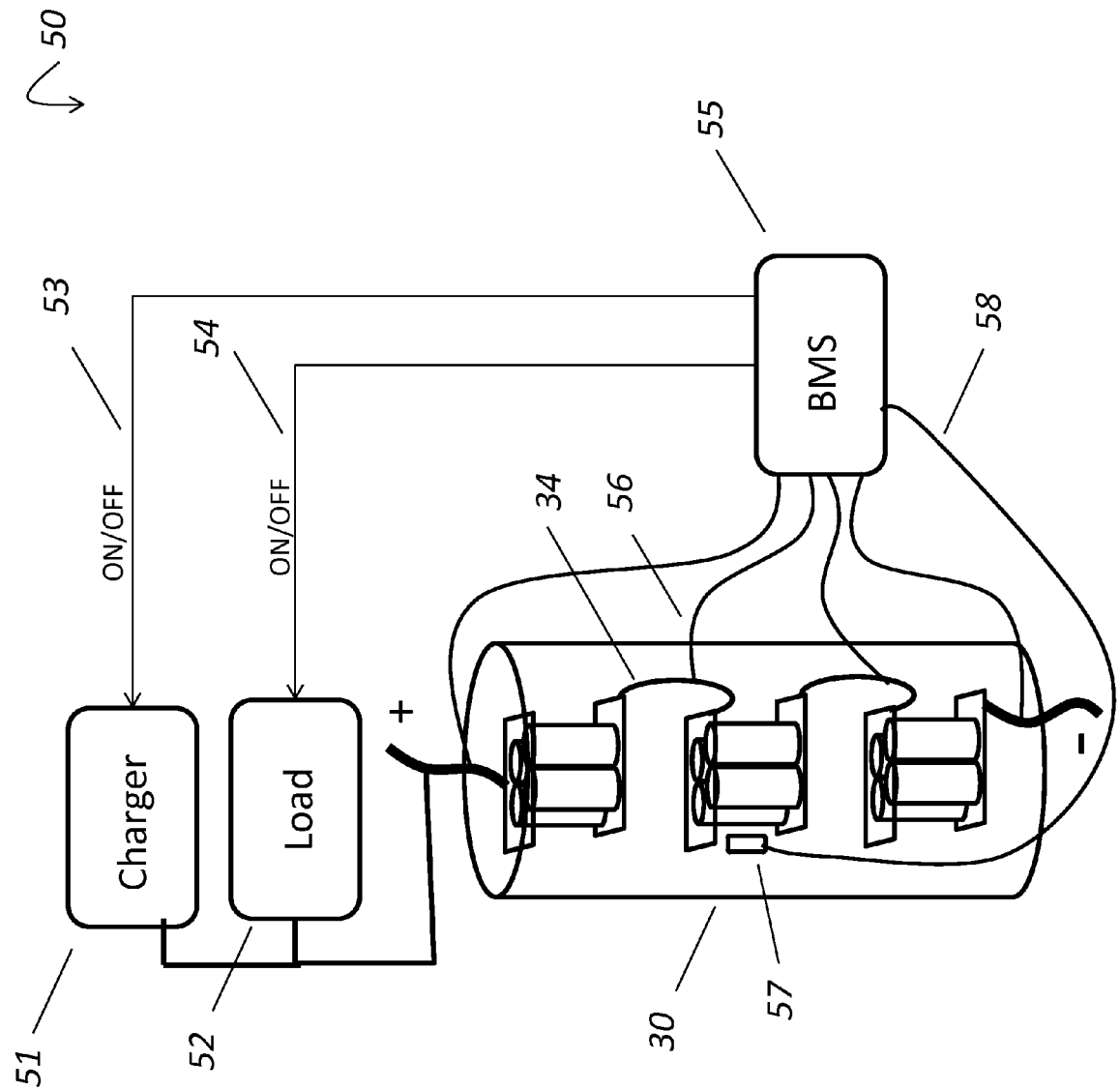
FIG. 7: A Battery with a BMS as known in the prior art.

The disclosed invention uses a key component—Dual Pole Single Throw (DPST) electrical switch. In FIG. 8, a logical and functional diagram of the DPST switch 100 is shown. The function may be incorporated with a variety of technologies, including electromechanical relay, and solid state optically driven Mosfets. The switch 100 has four main electrical terminals 101 & 102 on one side, and 103 & 104 on the other side. The pins 101 and 103 are separated by an electrical bridge 107. The same bridge 107 also separates the pins 102 and 104. The bridge 107 may be actuated with a physical actuation signal 105 such as an electrical voltage, a magnetic field or an optical signal. When actuated, the bridge 107 closes the path 101 to 103 and the path 102 to 104 electrically. The actuation terminal 105 (Control or CTL) accepts a binary on/off signal to the switch 100. The signal may be of electrical, optical or other kind of physical stimulus. The electrical configurable path 105 responds to CTL in the following way:
(a) When CTL is OFF, the electrical path between 101 and 103 is open. The electrical path between 102 and 104 is also open.
(b) When CTL is ON, the electrical path between 101 and 103 is closed. The electrical path between 102 and 104 is also closed.
(c) Irrespective of the state of CTL, 101 never makes a connection with 102 or 104. Irrespective of the state of CTL, 103 never makes a connection with 102 or 104.
While FIG. 8 shows the connection model of the DPST in its CTL=OFF state, the FIG. 9 shows the connection model of the DPST in its CTL=ON state.

Such DPST switches are currently available in the form of electromechanical relay or solid state Mosfet. An example of electromechanical relay form of DPST is G2RL-2 series from Omron. An example of solid state Mosfet form of DPST is AQW214EAX series from Panasonic Electric Works. These devices are used in the preferred embodiment of the invention.

It may be noted that some switches may be available with the control polarity opposite to what is described above, and it is understood that a practitioner of the art in the field would still be able to use them for the same purpose by reversing the driving algorithm.

It is also to be noted that it is the switching function that is essential to the embodiment of the invention. Although the DPST is introduced here as a means, the same function may be achieved by many other well-known circuits and devices.

Figure 15:
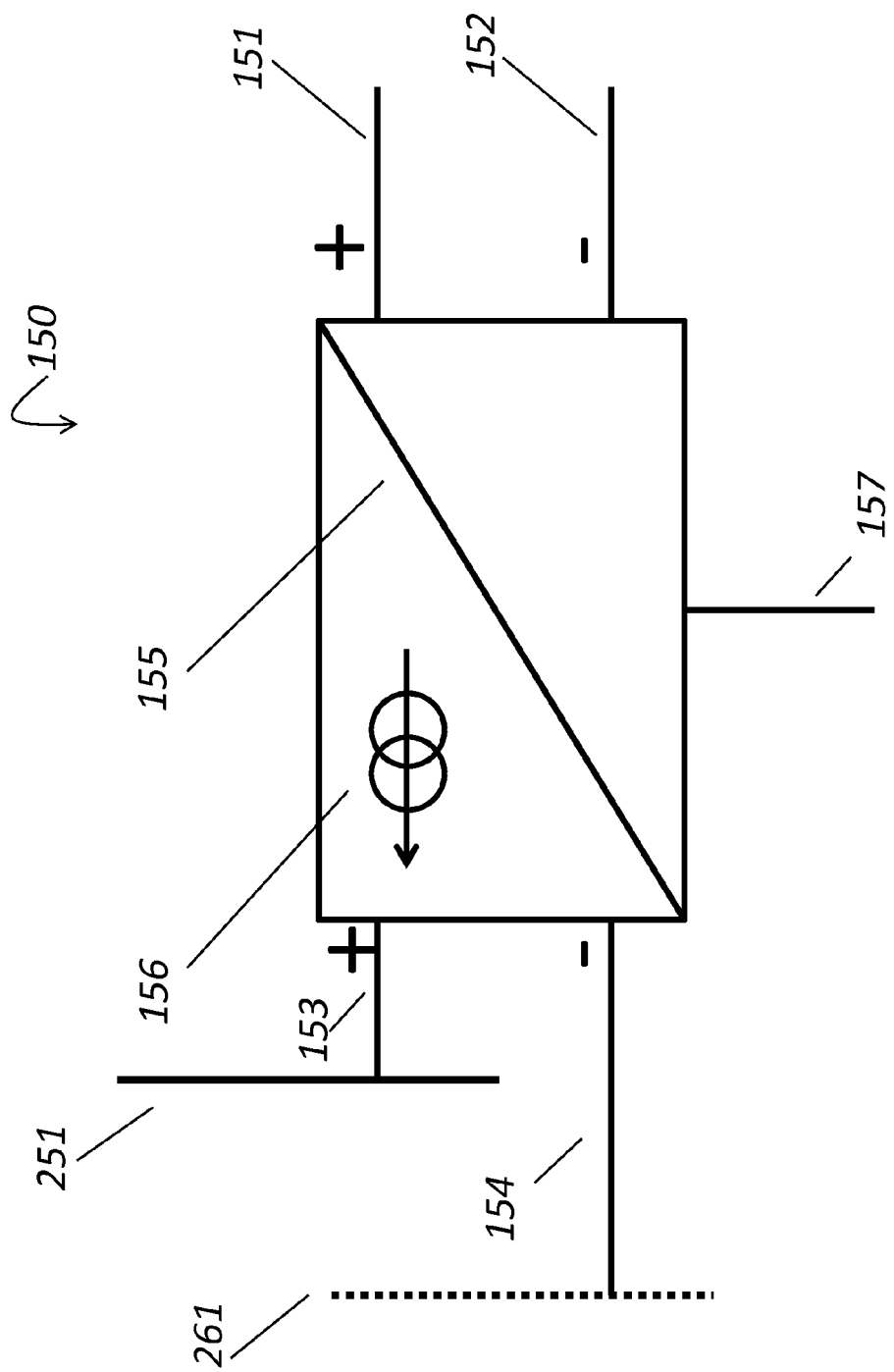
FIG. 15: Diagram of an isolated current charger used in the invention.

Isolated Current Injection Supply (ICIS):

Embodiment of this invention calls for an Isolated Current Injection Supply (ICIS) 150, described in FIG. 15. The terminals 151 and 152 are connected to a voltage supply at its positive and negative terminals, respectively. These are called input terminals. The terminals 153 and 154 are the positive and negative of the output. The output is a current supply with a maximum voltage clamp. The barrier 155 represents the electrical isolation between the input and output. The control 157 tells the circuit how much current it can supply on the output subject to a maximum output voltage, or can completely turn the current off.

The positive output terminal 153 is connected to a power buss 251. The negative terminal 154 is connected to a power buss 261. The busses 251 and 261 form a power supply that is electrically isolated from any other potential in the system as long as all the CTL signals are OFF The input terminals 151 and 152 are connected to battery terminals 31 and 32, respectively in the preferred embodiment, but can be connected to any other potential difference available in the system as long as that would support the current and voltage required by the ICIS.

In a the preferred implementation, the ICIS is a fly-back switch mode isolated power supply running from an input voltage and supplying current at the output, the current being controlled by a closed-loop optical feedback to the primary circuit.

In a simpler implementation, the ICIS is a flyback switch mode isolated power supply running from an input voltage and supplying a programmable or constant voltage on the output, the current being limited by a resistor.

It may be noted that the fundamental intention is to provide electrical energy at the output terminals 153 and 154 that is electrically isolated from the rest of the electrical potentials in the system. Such intention may be accomplished with many other power supply topologies known to a practitioner of the art in the field.

Figure 10:
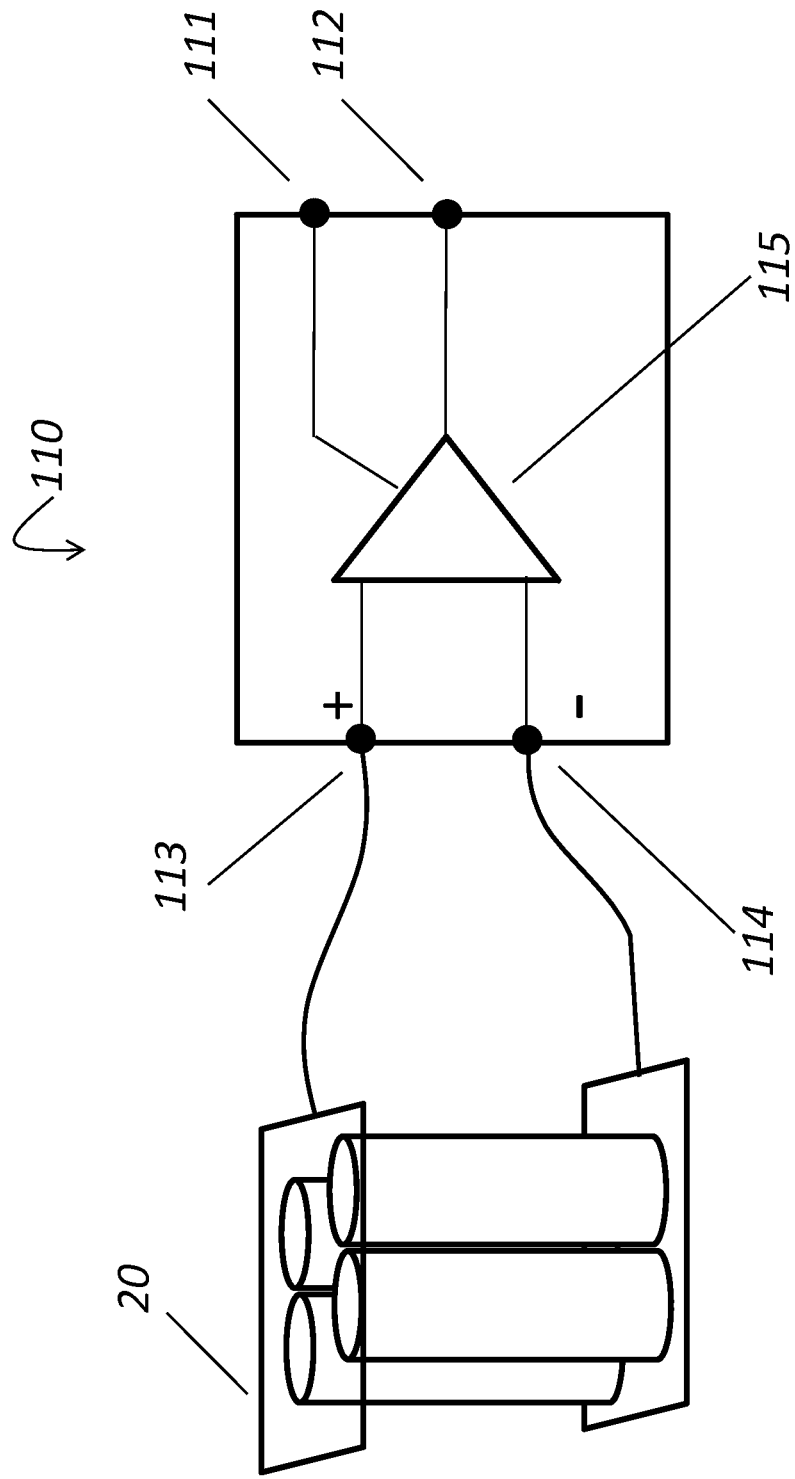
FIG. 10: A Voltage Monitoring Card for Blocks.

Voltage Monitoring Circuit (VMC):

Another key component in the current invention is a voltage monitoring circuit 110 that measures the voltage of each Block 20 as shown in FIG. 10. The circuit 110 connects to the positive and negative terminals of Block 20 with inputs 113 and 114, respectively. The difference in the voltage between the two terminals 113 and 114 is amplified and conditioned by an amplifier 115, and a proportional signal is provided on terminal 112. Depending on the type of the circuit, the very act of reading the voltage results in a minor drainage of current from the Block, and hence to minimize that, a control signal 111 may be provided to the circuit 110 to enable it while being read, and disable it otherwise. The input impedance of the circuit, for example, impedance between terminals 113 and 114 is high, so that no substantial amount of current flows. Therefore, it prevents any substantial energy loss from the block while voltage is being measured. Input impedance of 100 kilo-Ohms or larger are preferred.

Figure 11:
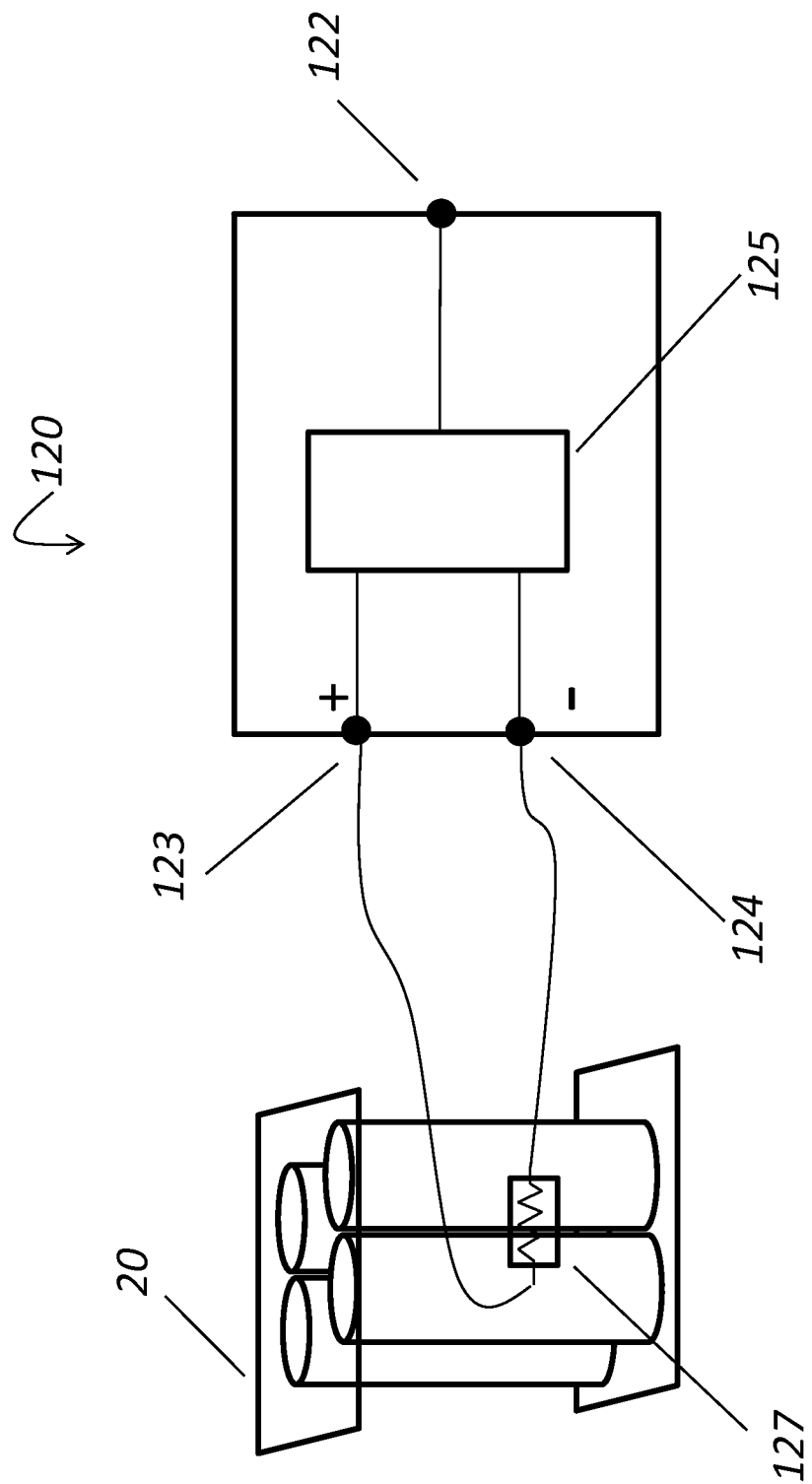
FIG. 11: A Temperature Monitoring Card for Blocks.

Temperature Monitoring Circuit (TMC):

Another key component in the current invention is a temperature monitoring device and circuit as described in FIG. 11. A temperature measuring element 127 is placed on or in the Block 20, and its stimulus is quantified by the monitoring device 120 through its inputs 123 and 124. An appropriate amplifier 125 conditions the signal and provides a proportionate signal on the terminal 122.

The temperature monitoring device 127 may be comprised of many different kinds of technologies, such as thermistor, RTD, and Mosfet. In the preferred embodiment of this invention, a 50,000 Ohm Thermistor bearing part number NTSD1WD503FPB30 from Murata Electronics has been used.

Primary Embodiment

Figure 12:
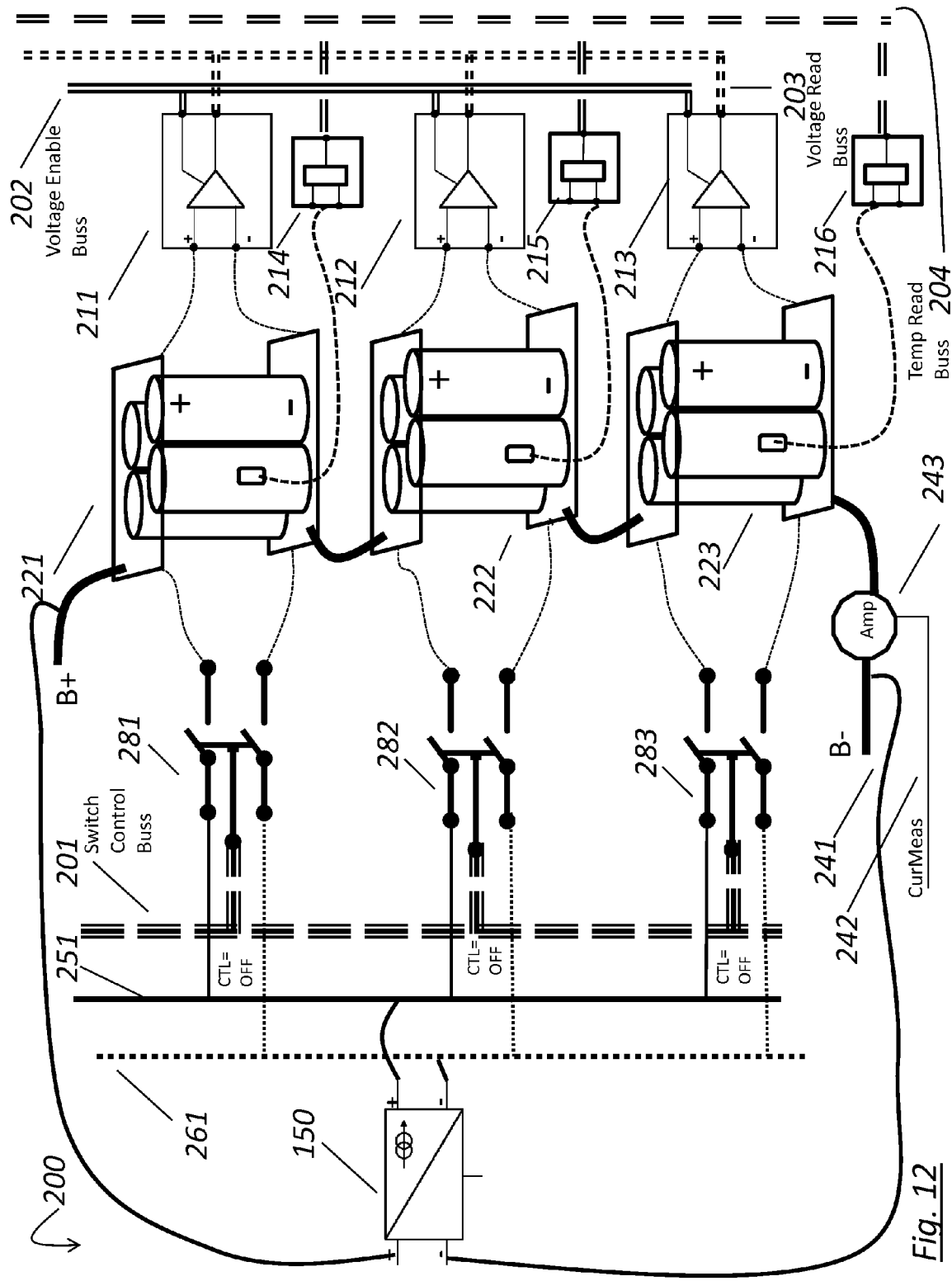
FIG. 12: Monitors, Actuators and Switch connections for a Battery according to the current invention.

The incorporation of these elements in the current invention of BMS in the battery pack is described as system 200 in FIG. 12. In system 200, three Blocks 221, 222, and 223 are shown to make up the Battery. They are arranged in the sequence of decreasing voltage in the Battery. Although only 3 Blocks are shown, the same invention can be applied in a similar method to any number of Blocks ranging in number from 2 to any large number. The Blocks 221, 222 and 223 are read by VMCs 211, 212, and 213, respectively. The outputs of the VMCs are connected to the Voltage Reading Buss (VRB) 203. The amplifier enable ports of the VMCs are connected to the Voltage Enable Buss (VEB) 202. The Blocks 221, 222 and 223 have thermistors incorporated in the packaging, and the respective thermistors are read by Temperature Monitoring Circuits (TMC) 214, 215 and 216, respectively. Outputs of the TMCs are connected to the Temperature Measurement Buss (TMB) 204. The Busses 202, 203 and 204 are connected to a central circuit to be described later.

The ICIS 150 is connected to the battery terminals 221(B+) and 241(B−), on its inputs. The positive 153 and negative 154 isolated output lines are connected to the isolated busses 251 and 261, respectively.

Three DPST switches are used in this description. The switches 281, 282, and 283 are dedicated to the Blocks 221, 222 and 223, respectively. The connections are made in such a way that one terminal of one side of the DPST switch is connected to the positive polarity of the Blocks and the other terminal of the same side is connected to the negative polarity of the same Block.

The other side of the DPST switches is connected to the isolated power Busses 251 and 261, such that when any switch closes, the positive power Buss 251 would make an electrical connection to the positive terminal of the respective Block, and the negative power Buss 261 would make an electrical connection to the negative terminal of the respective Block.

The negative terminal of the Block 223 is connected to the negative terminal of the Battery 241 (B−).

A current sensor 243 is incorporated on the B-line to measure the Battery current which is reported through a signal 242 to a central processing unit as described later. It is to be noted that the current sensor could be installed on the positive line B+ as well. A Hall-Effect current sensor from Honeywell CSLA1CE was used in this embodiment, although other kinds, such as shunt resistors may be used for the purpose as well.

The control ports of the switches 281, 282 and 283 are connected to a Switch Control Buss (SCB) 201, which is connected to a central processing unit to be described later.

When the all the CTL ports of the switches receive an OFF signal through the buss 201, the electrical connections of the switches to the Blocks are shown as in FIG. 12. It can be observed that no current flows from the isolated busses to any Block, hence no balancing activity takes place.

Figure 13:
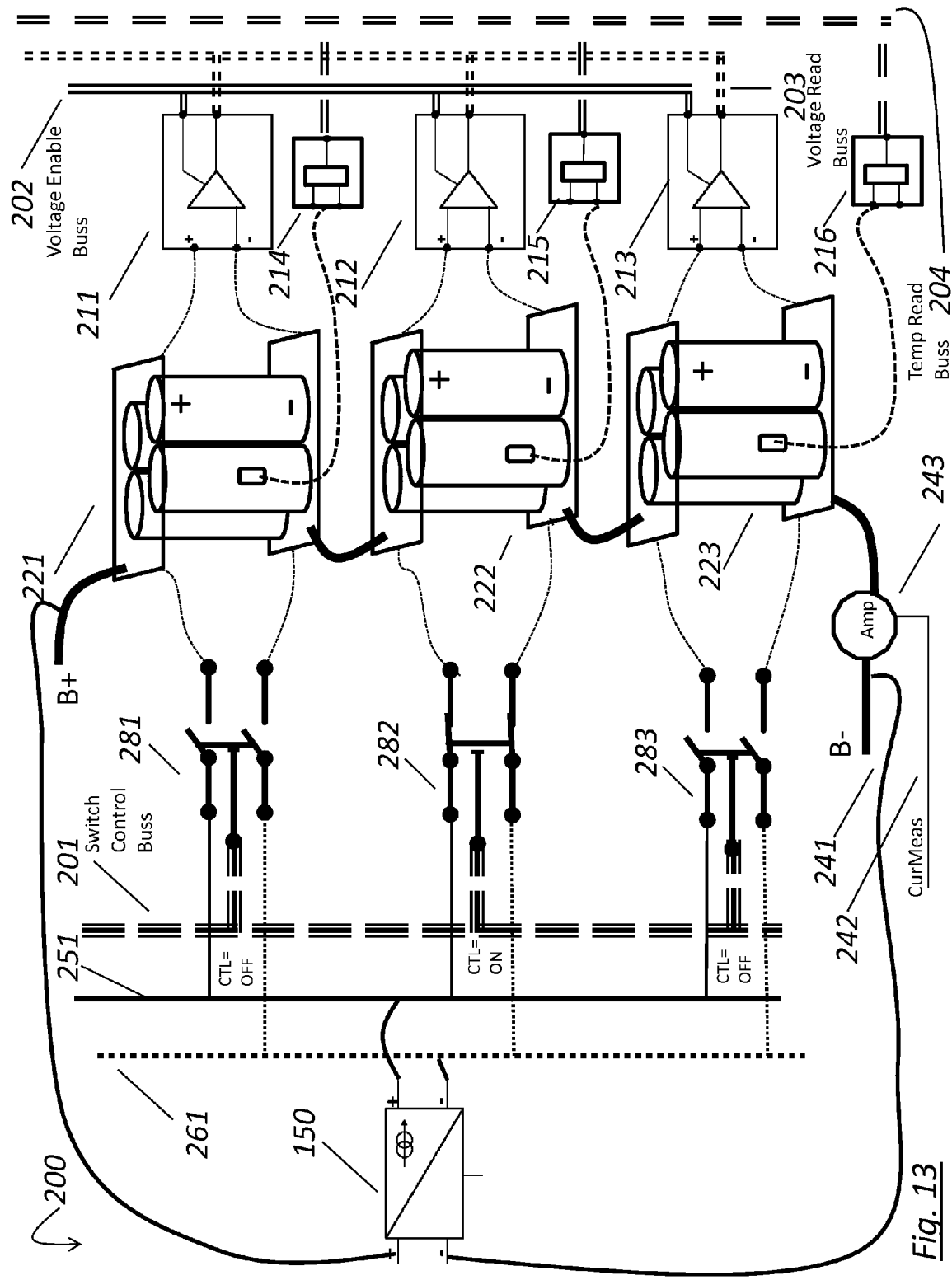
FIG. 13: Switch connections for a Battery with one switch activated according to the current invention.

When one of the CTL ports receives an ON signal, for instance the switch 282, then the situation is shown in FIG. 13. In response to the signal, the DPST 282 closes both the terminals, and as a result, current from isolated busses 251 and 261 flow into the Block 222. It may be noted that this kind of injection current is independent of the main charging and discharging currents that flow through the main stack and does not disturb the normal Battery activities. The cell 222 gets some more charging than the rest of the Blocks as a result of this activity.

Figure 14:
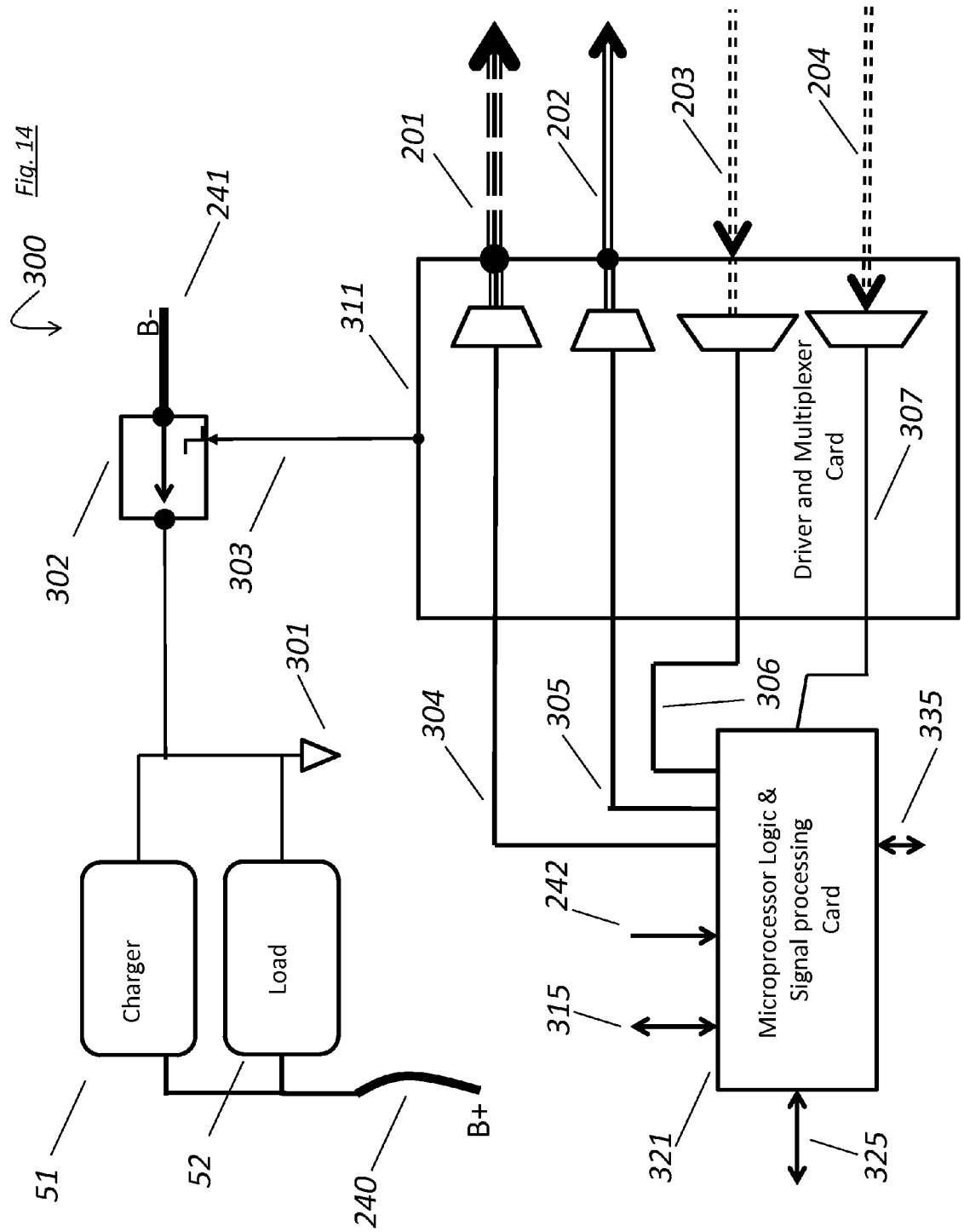
FIG. 14: Balance of the System for the BMS and Battery according to the current invention.

The connection of the Battery in the Pack is shown in FIG. 14 as Balance of the System (BOS) 300. The Battery Charger 51 provides the voltage and current according to the need of the system. In this implementation it is a Constant-Current-Maximum-Voltage (CCMV) charger wherein the charger pushes a prescribed about of current into the Pack as long as the Pack voltage is less than a prescribed Maximum Voltage. When the Maximum Voltage is reached, the Charging Current is tapered down so as to keep the Pack voltage a constant at the value of Maximum Voltage. The negative terminal of the Charger 51 is connected to the system ground 301. The positive terminal of the Charger 51 is connected to the Battery positive 240 (B+), which further flows in FIGS. 12 & 13. The pack discharges into a Load 52 which may have varying current requirements and may even have its own power conditioning circuits to change the voltage or current levels for a final application. The negative terminal of the Load 52 is connected to the system ground 301. The positive terminal of the Load 52 is connected to the battery positive 240 (B+), which further flows in FIGS. 12 & 13. The period of switching between the voltages of the blocks are measured and the activation of the DPST switches are in effect, is less than 10 times of a total average charge time of the battery block assembly required by an application.

An electronic switch 302 in the form of a solid state switch is placed on the return line 241 (B−) before it goes to the ground. The electronic switch acts in response to a control signal 303 delivered from the system electronics to be described below. The system algorithm may activate this switch to open the Battery current path from the charger 51 or load 52 during many circumstances including, but not limited to, over-charging, over-discharging, short-circuit, and over-temperature. While the electrical interruption device 302 is in the open state, and the charger loses its power, necessitating the pack to provide current to the load, the device 302 detects the power failure and closes itself during a time period not material to the operation of the load.

The whole Pack system is controlled by a microprocessor unit (MPU) 321, which includes a microprocessor and many auxiliary units, such as memory, Analog to Digital Converter (ADC), Amplifiers and other signal conditioners and recorders. It also communicates with the sensors and actuators in the battery pack via a Driver and Multiplexer Card (DMC) 311. The MPU 321 communicates with the DMC 311 through the channel 304 to control the Switch Control Buss (SCB) 201. The MPU 321 communicates with the DMC 311 through the channel 305 to control the Voltage Enable Buss (VEB) 202. The MPU 321 communicates with the DMC 311 through the channel 306 to read the Voltage Reading Buss (VRB) 203. The MPU 321 communicates with the DMC 311 through the channel 307 to read the Temperature Reading Buss (TRB) 204.

The MPU 321 reads the current measurement 242. It also stores and retrieves system and temporal information, such as calibration constants, real time clock, and algorithm parameters with a memory device through the port 335. The MPU 321 communicates with the outside world through the communication post 325. In this example, it is an RS-232 port that transmits and receives data in both wire-line and wireless means.

The MPU 321 actuates and controls a thermal control device through the port 315. In this embodiment, it is a bi-directional thermoelectric (TEC) device that is capable of both, cooling, and heating the device, depending on the need.

The algorithm of the BMS implemented for the operation of the Battery is described below.

In this implementation, the Pack was required to be charged at 0.5 C rate. Therefore the time taken to fully charge the system from zero state of charge is about 2 hours. The load for the application was about 0.2 C. Therefore a fully charged Pack would take about 5 hours to fully discharge.

Algorithm During Charging:

During Charging, the voltages of the Blocks are measured by activating elements in the VEB 202 and reading the Block voltages through the VRB 203. The Block with the minimum voltage is determined to be the Xth Block. As the next step, the DPST switch corresponding to the Xth Block is turned ON through the SCB 201, with all other switches being OFF. That gives the Xth Block a chance to catch up in voltage with the rest of the blocks. Such condition is maintained for 1 minute, after which all the DPST switches are turned OFF. Such condition is maintained for 5 seconds so that all the Block voltages are stabilized. Now the process is started again with measuring all the voltages and finding out the lowest voltage block and isolating it. This cyclic operation is done about 100 times during 2 hours of charging, and that gives enough iteration to balance all the Blocks within reasonable means. Even if all the Blocks may not be balanced during one cycle, doing such algorithm over several cycles will balance them.

During the charging cycles, if any of the Blocks reach a prescribed maximum Block voltage, then the charging of the entire stack is deemed complete, and the MPU 321 opens the switch 302 to stop further charging. This prevents over-charging and damage to the battery. As described earlier, the device 302 reacts quickly to close itself upon a loss of power of the charger in order for the pack to provide power to the load.

During charging cycles, if any of the temperature sensors reads a temperature higher than 40 deg C. or lower than −20 deg C., then the TEC is turned on through the port 315 for cooling or heating, respectively. If all the temperature sensors do not get back to the given limits within 10 minutes, then MPU 321 throws the switch 302 is open, taking the Pack out of any external electrical influence.

Algorithm During Discharging:

During Discharging, the voltages of the Blocks are measured by activating elements in the VEB 202 and reading the Block voltages through the VRB 203. The Block with the minimum voltage is determined to be the Xth Block. As the next step, the DPST switch corresponding to the Xth Block is turned ON through the SCB 201, with all other switches being OFF. That gives the Xth Block a chance to catch up in voltage with the rest of the blocks. Such condition is maintained for 1 minute, after which all the DPST switches are turned OFF. Such condition is maintained for 5 seconds so that all the Block voltages are stabilized. Now the process is started again with measuring all the voltages and finding out the lowest voltage block and isolating it. This cyclic operation can be done about 100 times during 2 hours of charging, and that gives enough iteration to balance all the Blocks within reasonable means. Even if all the Blocks may not be balanced during one cycle, doing such algorithm over several cycles will balance them.

During the discharging cycles, if any of the Blocks reach a prescribed minimum Block voltage, then the discharging of the entire stack is deemed complete and the MPU 321 opens the switch 302 to stop further discharging. This prevents over-discharging and damage to the battery.

During charging cycles, if any of the temperature sensors reads a temperature higher than 40 deg C. or lower than −20 deg C., then the TEC is turned on through the port 315 for cooling or heating, respectively. If all the temperature sensors do not get back to the given limits within 10 minutes, then MPU 321 throws the switch 302 is open, taking the Pack out of any external electrical influence.

During Either Charging or Discharging:

The health of the system and its Blocks is monitored every minute and the data are conveyed to an external computing device for further analysis. An offline or online analysis may be done with or without human participation.

Other Implementations:

The disclosed example shows a typical application of the invention, and a practitioner of the field would derive many similar applications based on the invention, which are covered under the rights of this invention.

Although in the given example, the time period during which a particular Block is given current injection depends on the voltage readings of all the Blocks, leading to a Voltage-based algorithm, in another implementation, the decision may be based on calculation on State of Charge (SOC) or based on Coulomb Counting.

In another implementation, one or more Blocks would have a different nominal capacity than the rest of the Blocks. The Blocks can still be charged and discharged simultaneously, thereby providing maximum capacity, by injecting current into the lower capacity Blocks with a systematically lower duty factor, as determined by an appropriate algorithm.

In yet another implementation, one of more Blocks would have cells of a different chemistry than other Blocks, leading to a different Block voltage and a different voltage-current characteristics. The Blocks can still be charged and discharged simultaneously, thereby providing maximum capacity, by injecting current into the lower capacity Blocks with a systematically higher duty factor, as determined by an appropriate algorithm.

The invention claimed is:

1. A battery management system (BMS) comprising:
a battery block assembly comprising:
at least two blocks of electrochemical cells;
at least two dual pole single throw (DPST) switches each having a first terminal and a second terminal on a first side and a third terminal and a fourth terminal on a second side;
a plurality of high impedance circuits;
one or more independently isolated power supplies and
a central processor; wherein
the at least two DPST switches each are paired with a block of the at least two blocks;
each of the first terminals of the at least two DPST switches is connected to a positive polarity of the respectively paired block of the at least two blocks;
each of the second terminals of the at least two DPST switches is connected to a negative polarity of the respectively paired block of the at least two blocks;
the voltages of the at least two blocks each are monitored by a high impedance circuit of the plurality of high impedance circuits in response to a command from the central processor;
the at least two blocks each are connected to an independently isolated power supply of the one or more independently isolated power supplies when the paired DPST switch of the respective block of the at least two blocks is activated;
the at least two blocks each are not connected to the one or more independently isolated power supplies when the paired DPST switch of the respective block of the at least two blocks is not activated; and
no combinations of activations of the at least two DPST switches result in two blocks of the at least two blocks being connected to a selected independently isolated power supply of the one or more independently isolated power supplies.

2. The BMS of claim 1, wherein
periodically the voltages of the at least two blocks are monitored;
in response to an unbalanced state, one or more blocks of the at least two blocks having lower capacities than other blocks are connected to the one or more independently isolated power supplies by activating the at least two DPST switches; and
extra charges are added to the one or more blocks having lower capacities.

3. The BMS of claim 2, wherein the period of switching between the voltages of the blocks of the at least two blocks are measured and the activations of the at least two DPST switches are in effect, is less than 10 times of a total average charge time of the battery block assembly required by an application.

4. The BMS of claim 2, wherein balancing of voltages of the blocks of the at least two blocks takes place during both charging and discharging of the battery block assembly.

5. The BMS of claim 1, wherein during charging, the battery block assembly is electrically disconnected from other electrical devices when:
(a) the voltage of any block of the at least two blocks is greater than a prescribed maximum voltage limit;
(b) a total number of Coulombs counted into the battery block assembly exceeds a prescribed maximum count limit; or
(c) the current through the battery block assembly exceeds a prescribed maximum current limit.

6. The BMS of claim 1, wherein during discharging, the battery block assembly is electrically disconnected from other electrical devices when:
(a) the voltage of any block of the at least two blocks is smaller than a prescribed minimum voltage limit;
(b) a total number of Coulombs counted out of battery block assembly exceeds a prescribed maximum count limit; or
(c) the current through the battery block assembly exceeds a prescribed maximum current limit.

7. The BMS of claim 1, wherein the at least two DPST switches each are an electro-mechanical relay with one throw position and two poles.

8. The BMS of claim 1, wherein the at least two DPST switches each are a solid state electrical switch with no moving parts and with one throw position and two poles.

9. The BMS of claim 1, wherein the battery block assembly has at least one block of the at least two blocks that is of different chemistry than the rest of the blocks.

10. The BMS of claim 1, wherein the central processor reads the block voltages and actuates the at least two DPST switches according to a predetermined algorithm.

* * * * *